United States Patent [19]

Emter

[11] Patent Number: 4,747,607
[45] Date of Patent: May 31, 1988

[54] LOBED CHUCK FOR SAW REGRINDING

[76] Inventor: James Emter, 23429 NE. 29th Ave., Ridgefield, Wash. 98642

[21] Appl. No.: 31,772

[22] Filed: Mar. 30, 1987

[51] Int. Cl.⁴ .............................................. B23D 63/08
[52] U.S. Cl. ..................................... 279/1 L; 51/225; 76/79; 269/52; 279/1 R
[58] Field of Search ................. 279/1 L, 1 R; 269/47, 269/52; 51/168, 218 R, 225; 76/45, 78 R, 79; 83/665, 666

[56] References Cited

U.S. PATENT DOCUMENTS 2,972,266 2/1961 McEwan ................................ 76/79
3,516,460 6/1970 Thrasher .......................... 83/665 X
3,701,539 10/1972 Morawski et al. ............... 269/52 X Primary Examiner—Gil Weidenfeld
Assistant Examiner—Steven C. Bishop
Attorney, Agent, or Firm—Chernoff, Vilhauer, McClung & Stenzel

[57] ABSTRACT

A chuck for a circular saw includes a frusto-conical plate having a plurality of frusto-conical lobes which snugly engage scallops forming an outer diameter of a mounting aperture in a saw blade adapted to be mounted on a splined arbor. With the saw mounted on the chuck in this manner the concentricity of the outer diameter of the saw and the outer diameter of the mounting aperture is assured as the saw teeth are reground.

3 Claims, 1 Drawing Sheet

LOBED CHUCK FOR SAW REGRINDING

BACKGROUND AND SUMMARY OF THE INVENTION

The following invention relates to a lobed chuck for holding a saw blade during a regrinding operation.

Circular saw blades such as those used in sawmills for cutting boards from logs typically must be sharpened or reground on a regular basis. The regrinding of the saw teeth requires both a side regrinding and a top regrinding operation. The regrinding of the top of the saw tooth is especially critical because the teeth must be reground to precise tolerances with respect to the diameter of the shaft which holds the circular saw while in ordinary use.

Many such saw blades are adapted to be fitted on splined arbors, and as such, have a circular inner diameter aperture and an outer diameter aperture which represents the inner diameter plus twice the radius of a plurality of semicircular scallops which are cut in order to fit the saw onto the splines of the arbor. With these saws, the critical dimension which must be maintained for efficient operation is the distance between the tip of the saw teeth, i.e., the outermost diameter of the saw blade, and the outer diameter of the saw's center mounting aperture. This is because in normal operation the scallops which engage the splines of the arbor will experience wear which may be uneven. This in turn will cause the saw blade to engage the wood in an uneven manner.

As an example, saws are dimensioned for a particular "chip load." The chip load is the amount of wood that the saw will rake during each revolution. When the saw's mounting aperture is not true with respect to the outer diameter of the blade, the chip load may be greater on one side of the saw than the other. In its worst case this can cause catastrophic failure of the blade. It is therefore critically important to maintain precise tolerances between the outer diameter of the saw blade, i.e., the tip of the teeth and the outer diameter of the scalloped mounting aperture.

In the past, saw blades have been reground in machines that hold the saw blade steady on a chuck and which rotate it while grinders grind the top of the saw teeth. Such chucks are typically frustum-shaped members which snugly engage the inner diameter of the mounting aperture so that the regrinding of the teeth to the tolerance desired is done with reference to the inner diameter. As mentioned above, however, the wear during normal use is experienced along the outer diameters of the scallops of the saw blade's mounting aperture and regrinding the saw with reference to the inner diameter will not assure concentricity of the mounting aperture with respect to the splined arbor.

SUMMARY OF THE INVENTION

These problems are solved by the present invention which comprises a chuck for holding a saw blade for regrinding where the saw blade includes a plurality of substantially semicircular scallops for mounting on a lobed or splined arbor. The chuck comprises a frusto-conical member having at least three lobes for snugly engaging the saw blade along an outer diameter of at least three of the scallops of the saw blade mounting aperture as the saw blade is firmly pressed onto the chuck. The lobes also are semi-frosto-conical which facilitates the insertion of the chuck into the saw blade.

Since it is conventional in this industry to manufacture saw blades having a number of scallops for splined arbors which is divisible by either three or four, the minimum number of lobes for the chuck of the present invention will be either three or four.

As the saw blade is fitted onto the chuck, the lobes snugly engage the outer diameters of at least three of the scallops and the resulting regrinding operation is therefore true with reference to these outer diamters as opposed to the inner diameter of the saw blade. This assures that the chip load on all of the saw blade teeth is the same.

It is a primary object of this invention to provide a chuck for mounting a saw blade for regrinding so that the regrinding operation will assure true concentricity of the mounting aperture with respect to the saw teeth.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 2:
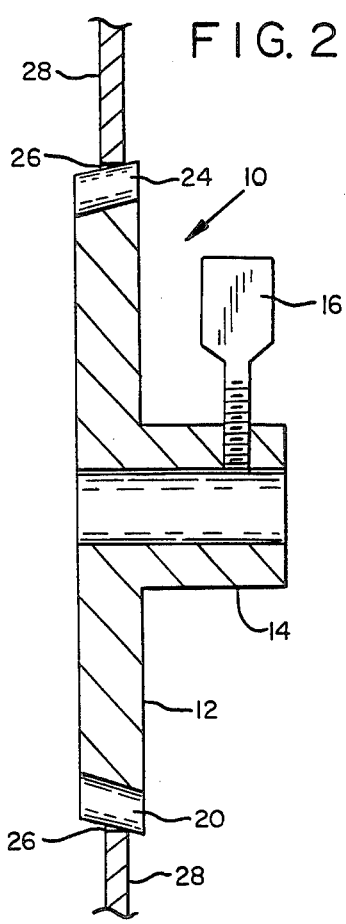
FIG. 2 is a partial cutaway view taken along line 2—2 of FIG. 1.
Figure 1:
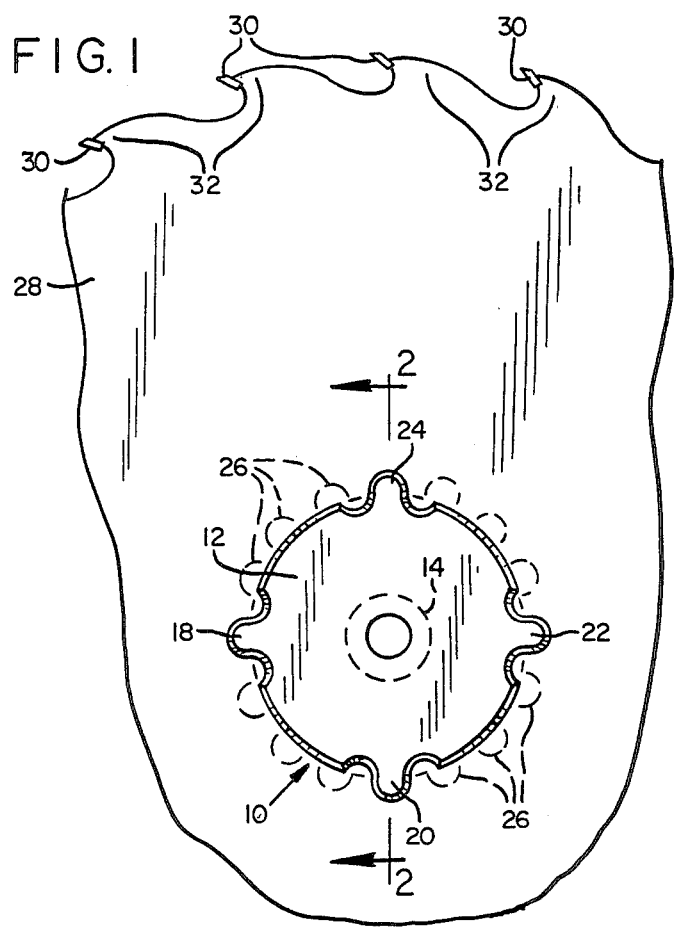
FIG. 1 is a bottom view of the chuck of the present invention with a saw blade mounted thereon.
Figure 3:
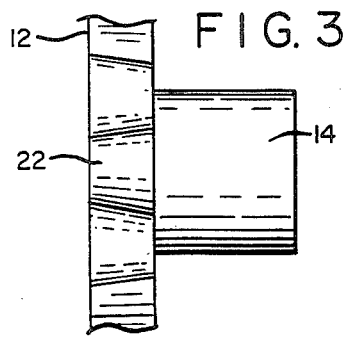
FIG. 3 is a fragmentary side elevation view, at an enlarged scale, of the chuck.
Figure 4:
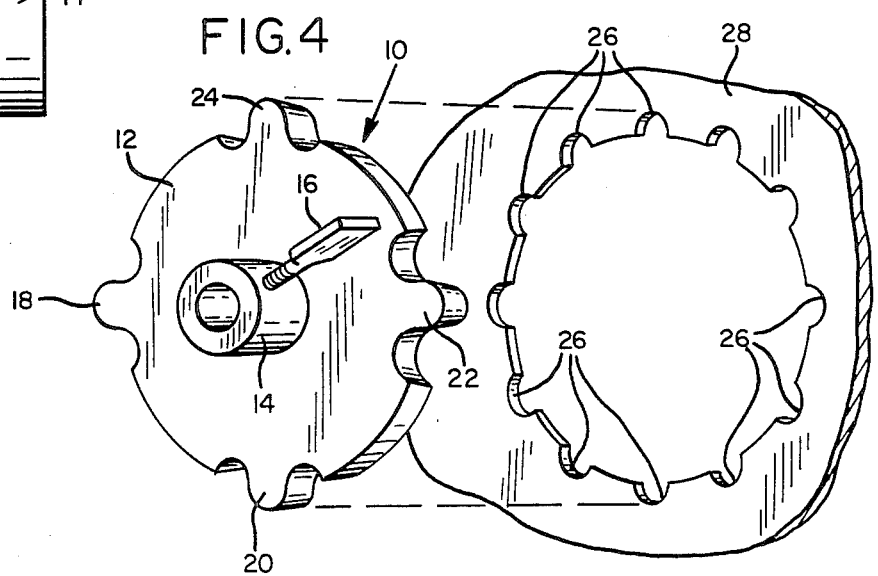
FIG. 4 is a partial perspective view of the chuck of FIG. 1 about to engage a saw blade.

A chuck 10 comprises a frusto-conical plate 12 and a cylindrical projection 14 for mounting on an axle (not shown). A thumbscrew 16 may be used to secure the chuck 10 to the axle. The frusto conical plate 12 includes a plurality of semi-frusto-conical lobes 18, 20, 22 and 24 which fit snugly into semicircular cutouts or scallops 26 in saw blade 28. As best shown in FIG. 2 the angle of the frustum-shaped plate 12 and of the lobes enables the lobes 20 and 24 to snugly engage the outer diameters of the scallops 26 as the saw blade 28 is pressed onto the chuck 10 and yet does not require that the lobes initially be precisely alligned with the scallops. This ensures that the chuck can easily and quickly be inserted into the saw blade, and yet when the tips 30 of the saw teeth 32 are reground that the chip load will be even for each of the saw teeth 32.

The actual angle of the cone from which member 12 is formed and the cone of the lobes 18, 20, 22 and 24 can be very small, as little as 1°–5°. The optimum cone angle is, however, 5°–15°. The lobes 18, 20, 22 and 24 may be milled directly from a frustum-shaped work piece to form plate 12. More than three or four lobes may be used, but three or four is all that is required to hold the saw 28 firmly in place for regrinding. More lobes would be more expensive and would not appreciably improve performance.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A chuck for holding a saw blade during a regrinding operation wherein said saw blade includes a plurality of teeth and an aperture having an inner diameter and a plurality of substantially semicircular scallops forming an outer diameter for mounting said saw blade on a splined arbor, said chuck comprising a frusto-conical member having at least three semispherical tapered lobes for snugly engaging said saw blade through said aperture along said outer diameter by fitting tightly into at least three scallops of said aperture when said saw blade is pressed onto said chuck whereby the distance between the tip of each tooth of said blade and said outer diameter is evenly maintained during said regrinding operation to provide a substantially uniform chip load.

2. The chuck of claim 1 wherein said frusto-conical member includes at least four of said lobes.

3. The chuck of claim 2 wherein said frusto-conical member has a cone angle ranging from 5° to 15°.